United States Patent [19]
Kurami et al.

[11] Patent Number: 5,208,750
[45] Date of Patent: May 4, 1993

[54] CONTROL SYSTEM FOR UNMANNED AUTOMOTIVE VEHICLE

[75] Inventors: Kunihiko Kurami, Kawasaki; Norimasa Kishi, Yokohama; Kazunori Noso, Yokohama; Akira Hattori, Yokohama, all of Japan

[73] Assignee: Nissan Motor Co., Ltd., Yokohama, Japan

[21] Appl. No.: 206,667

[22] Filed: Jun. 15, 1988

[30] Foreign Application Priority Data

Jun. 17, 1987 [JP] Japan .................................. 62-150452
Jun. 17, 1987 [JP] Japan .................................. 62-150453
Jun. 17, 1987 [JP] Japan .................................. 62-150461

[51] Int. Cl.$^5$ ............................................. G06F 15/50
[52] U.S. Cl. ............................... 364/424.02; 340/988; 180/168; 358/103
[58] Field of Search .............. 364/424.02; 340/988, 340/995, 996; 180/168; 358/103, 107

[56] References Cited

U.S. PATENT DOCUMENTS 4,652,803 3/1987 Kamejima et al. .................. 318/587

FOREIGN PATENT DOCUMENTS 2215576 10/1973 Fed. Rep. of Germany .

Primary Examiner—Vincent N. Trans
Attorney, Agent, or Firm—Foley & Lardner

[57] ABSTRACT

Stereo image data depicting the lane on which the vehicle is running is rectified into a planar image on which one or more level lines can be generated in a manner to intersect one or both of the edges of the lane. Angles are measured between lines which extend from these the points if intersection in directions normal to the level line or lines and lines which extend tangentially to any curvature which occurs in the road edges at the point of intersection. These angles are recorded, the difference therebetween determined and compared in a manner which determines the attitude of the vehicle on the road. The curvature of the road and the vehicle speed are determined and the best steering angle for the road wheels determined in accordance with a schedule which is recorded in terms of attitude and a parameter variable with the vehicle speed and road curvature.

38 Claims, 8 Drawing Sheets

CONTROL SYSTEM FOR UNMANNED AUTOMOTIVE VEHICLE

BACKGROUND OF THE INVENTION

1. Field of the Invention

The present invention relates generally to an autonomous control system for an automotive vehicle or the like and more specifically to a such a system which improves the reliability with which the vehicle can be automatically controlled.

2. Description of the Prior Art

Autonomous vehicular control systems proposed hitherto have attempted to guide the vehicle based on data derived by scanning the road centerline or the like predetermined indication which extends along the road on which the vehicle is running. Based on the data derived by observing the centerline (for example) these control systems have predicted the presence of curves in the road and suitably controlled the steering, brakes accelerator etc. However, these systems have lacked sufficient reliablity to enable a totally unmanned completely autonomously controlled vehicle to safely left to execute its work and/or navigate a given course without some form of human supervision or monitoring. For example, when the vehicle is traversing a road which curves and which changes direction frequently, such as a road which winds its way around the periphery of a bay or the like, control of the vehicle sometimes becomes sufficiently disoriented as to wind up driving around in circles.

SUMMARY OF THE INVENTION

It is an object of the present invention to provide an control system for an autonomous automotive vehicle or the like which system exhibits level of reliability which enables an unmanned vehicle to be left to execute various tasks and or navigate a winding road without the need of human supervision.

In brief, the above object is achieved by an arrangement Wherein stereo image data depicting the lane on which the vehicle is running is rectified in a planar image on which one or more level lines can be generated in a manner to interact one or both of the edges of the lane. Angles are measured between lines which extend from the points or intersection directions normal to the level line or lines and lines which extend tangentially to any curvature which occurs in the road edges at the point of intersection. These angles are recorded, the difference therebetween determined and compared in manner which determines the attitude of the vehicle on the road. The curvature of the road and the vehicle speed are determined and the best steering angle for the road wheels determined in accordance with a schedule which is recorded in terms attitude and a parameter variable with the vehicle speed and road curvature.

More specifically, a first aspect of the present invention comes in the form of: a method of controlling a vehicle, the method featuring the steps of: observing the road; producing an image of the road; rectifying the image in a manner which depicts the left and right hand edges of the lane on which the vehicle is running and which enables data to be read therefrom; determining the curvature of the road and the direction in which it is curving; determining the attitude of the vehicle on the road by determining the angle between the longitudinal axis and an imaginary line which runs along the middle of the lane depicted in the rectified image; determining the vehicle speed; determining a variable which varies as a function of road curvature, the distance of the center of the vehicle from a side of the lane on which the vehicle is running and the vehicle speed; using the attitude angle and the variable to derive a steering angle; and controlling the angle of the steering wheels of the vehicle with respect to the longitudinal axis of the vehicle to the derived steering angle.

A second aspect of the invention comes in that the step of curvature determination comprises: establishing a measurement level line on the rectified image at a location representative of a predetermined distance ahead of the vehicle; determining first and second points at the locations where the level lines intersects the left and right hand edges of the lane, respectively; determining the distance from the point that the longitudinal axis of the vehicle intersects the level line to the left hand edge of the lane; determining the distance from the point that the longitudinal axis of the vehicle intersects the level line to the left hand edge of the lane; generating first and second lines which pass through the the point and which extend parallel with the longitudinal axis of the vehicle and normal to the level; and generating third and fourth lines which pass through the first and second points and which extend tangentially with respect to any curvature which exists in the left and the road lane edges at the first and second points, respectively; and measuring first and second angles, the first angle being defined between the first and third lines and the second angle being defined between the second and fourth lines.

A third aspect of the invention comes in that the step of curvature determination comprises: establishing first and Second level lines on the rectified image, the first and second level lines being drawn on the image at first and second distances ahead of the vehicle, the second distance being greater than the first one; determining first and second points on a selected one of the left and right hand lane edges, where the first and second level lines intersect the same; generating first and second lines which pass through the first and second points and which are normal to the first and second level lines respectively and parallel with the longitudinal axis of the vehicle; generating third and fourth lines which pass through the first and second points respectively, the third and fourth lines being arranged to be tangential to and curve that exist in the selected one of the left and right hand lane edges; and measuring first and second angles, the first angle being defined between the first and third lines and the second angle being defined between the second and fourth lines.

A fourth aspect of the present invention comes in a vehicle which features first means for observing the road; second means responsive to the observing means for: producing an image of the road; rectifying the image in a manner which depicts the left and right hand edges of the lane on which the vehicle is running and which enables data to be read therefrom; determining the curvature of the road and the direction in which it is curving; determining the attitude of the vehicle on the road by determining the angle between the longitudinal axis and an imaginary line which runs along the middle of the lane depicted n the rectified image; determining the vehicle speed; determining a variable which varies a function of the road curvature, the distance of the center of the vehicle from a slide of the lane on which the vehicle is running and the vehicle speed; and using the attitude angle and the variable to derive a steering angle; and means for controlling the angle of the steering wheels of the vehicle with respect to the longitudinal axis of the vehicle to the derived steering angle.

A fifth aspect of the invention comes in that said second means establishes a measurement level line on the rectified image at a location representative of a predetermined distance ahead of the vehicle; determines first and second points at the locations where the level lines intersects the left and right hand edges of the lane, respectively; determines the distance from the point that the longitudinal axis of the vehicle intersects the level line to the left hand edge of the lane; determines the distance from the point that the longitudinal axis of the vehicle intersects the level line to the left hand edge of the lane; generates first and second lines which pass through the the point and which extend parallel with the longitudinal axis of the vehicle and normal to the level; and generates third and fourth lines which pass through the first and second points and which extend tangentially with respect to any curvature which exists in the left and the road lane edges at the first and second points, respectively; and measures first and second angles, the first angle being defined between the first and third lines and the second angle being defined between the second and fourth lines.

A sixth aspect of the present invention comes in that said second means: establishes first and second level lines on the rectified image, the first and second level lines being drawn on the image at first and second distances ahead of the vehicle, the second distance being greater than the first one; determines first and second points on a selected one of the left and right hand lane edges, where the first and second level lines intersect the same; generates first and second lines which pass through the first and second points and which are normal to the first and second level lines respectively and parallel with the longitudinal axis of the vehicle; generates third and fourth lines which pass through the first and second points respectively, the third and fourth lines being arranged to be tangential to any curve that exists in the selected one of the left and right hand lane edges; and measures first and second angles, the first angle being defined between the first and third lines and the second angle being defined between the second and fourth lines.

A seventh aspect of the present invention comes in the form of a system for autonomously controlling a vehicle, the system comprising: first and second cameras for observing the road on which the vehicle is running; a wheel speed sensor arrangement, the wheel speed sensor arrangement producing signal indicative of the rotational speed of first and second road wheels and from which the vehicle speed can be derived; an image computing section operatively connected to the first and second cameras, the image computing section including means for: producing an image of the road; rectifying the image in a manner which depicts the left and right hand edges of the lane on which the vehicle is running and which enables data to be read therefrom; and determining the curvature of the road and the direction in which it is curving; a steering control control section operatively connected with the image computing section, the steering control section including means for: determining the attitude of the vehicle on the road by determining the angle between the longitudinal axis and an imaginary line which runs along the middle of the lane depicted in the rectified image; determining a variable which varies a function of the road curvature, the distance of the center of the vehicle from a side of the lane on which the vehicle is running and the vehicle speed; and using the attitude angle and the variable to derive a steering angle; a steering control actuator, the steering control actuator being operatively connected with the steerable wheels of the vehicle; an actuator control section; the actuator control section being operatively interposed between the steering control section and the steering control actuator; the actuator control section controlling the angle of the steering wheels of the vehicle with respect to the longitudinal axis of the vehicle to the derived steering angle.

DETAILED DESCRIPTION OF THE PREFERRED EMBODIMENTS

Figure 1:
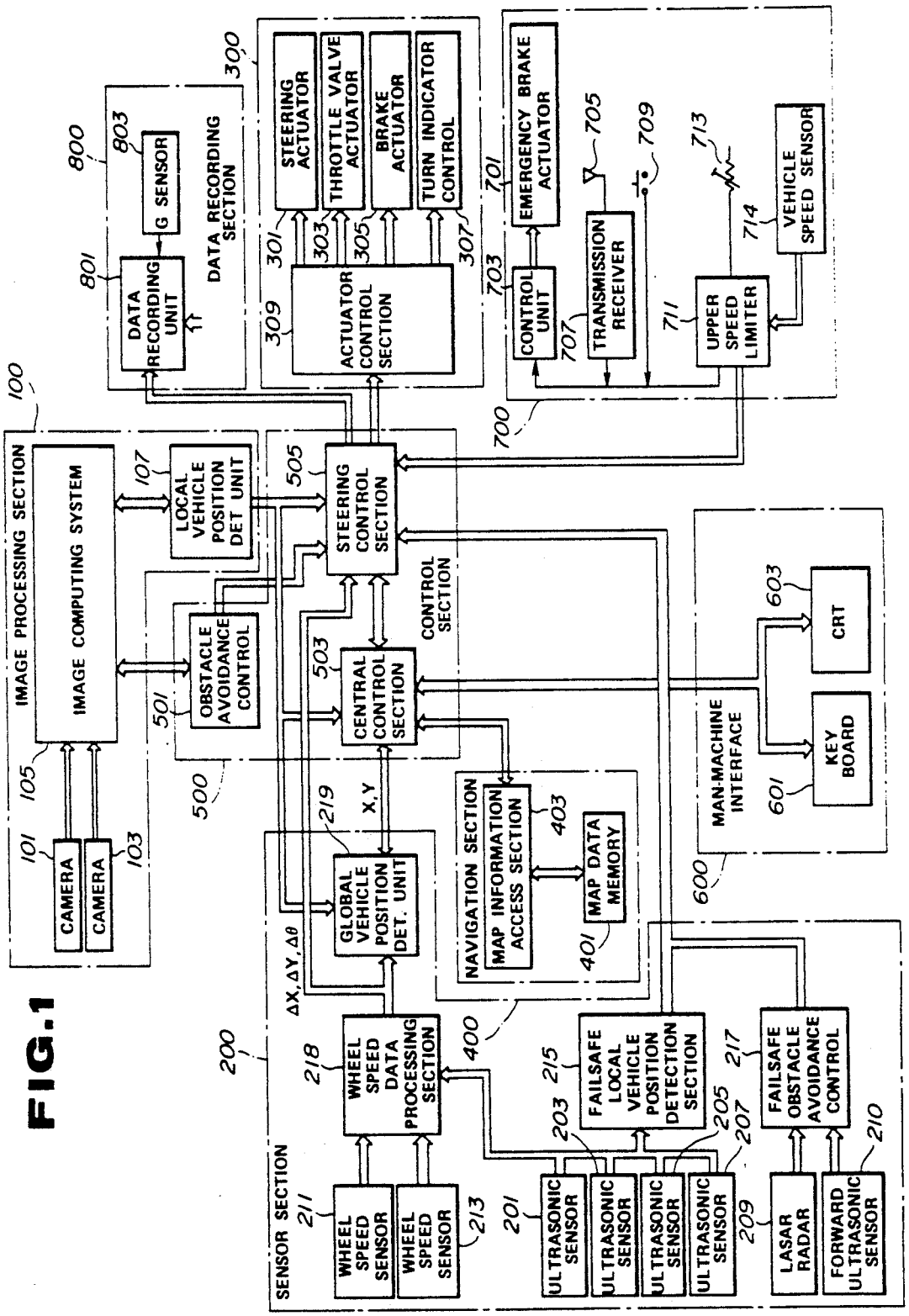
FIG. 1 shows in a block diagram the control system of is applied the present invention is applied.
Figure 2:
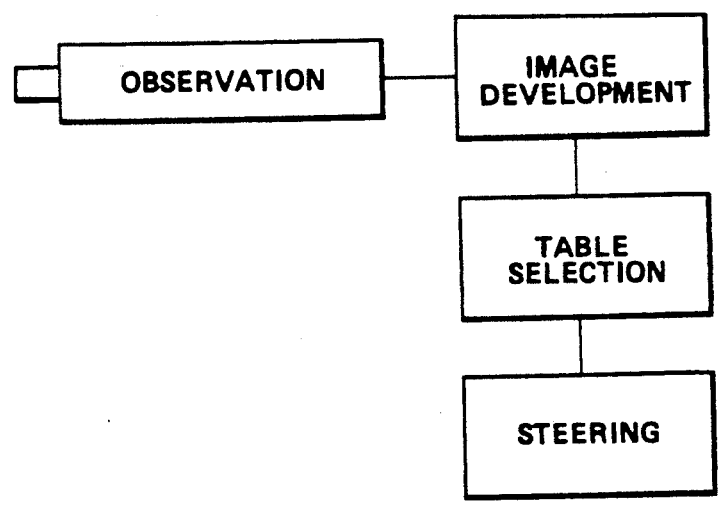
FIG. 2 is a block diagram which demonstrates the basic arrangement of the first embodiment.
Figure 3:
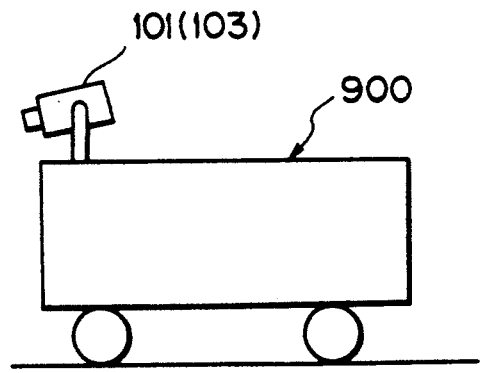
FIG. 3 is a side schematic elevation showing a an autonomous vehicle which is provided with cameras or the like sensor arrangement and which is controlled by the techniques which characterize the present invention.

FIG. 1 shows in block diagram form a system to which the embodiments of the present invention are applied. As shown, this system includes an image processing section 100 which includes two or more cameras or like sensors for observing the road on which the vehicle is running; a sensor section 200 equipped with ultrasonic sensors and/or laser radar which are arranged to probe the regions located in front of, on the sides of and to the rear of the vehicle; an actuator control section 300 which is arranged to control the operation of vehicle steering, engine power output, the application of the vehicle brakes and the vehicle turn indicators; a navigation section 400, which includes memorized map data and which supplies information relating to the location of the vehicle to a central control section 500. In the instant system, the latter mentioned section (500) functions, based on a number of inputs, to plan a course of action and subsequently derive a series of control commands and outputs the same of the above mentioned actuator control section 300 and other sections which will e mentioned hereinlater.

The arrangement further includes a man-machine interface section 600; a vehicle speed control section 700 which among other things limits the upper speed the vehicle can be permitted to attain; and a data recording section 800 which functions to record all of the vehicle operations in a manner similar to an air-craft "flight" recorder.

More specifically, the image processing section 100 includes a pair of cameras 101, 103 which are arranged at the front of the vehicle, for example at the front left and right corners of the same so as to enable the development of a stereo image. To increase the angle over which data can be collected, the cameras 101, 103 can be arranged to pivot and to sweep from side to side. The cameras 101 and 103, in this instance, are operatively connected with an image computing system 105 which is capable of converting the inputs therefrom into a planar image (and/or a three dimensional image or images). This image (or images) are used to determine the presence or absence of an obstacle in the path of the vehicle.

In addition to this, the image computing system 105 can be arranged to develop an image of which is on the road ahead of the vehicle in a manner depicts the position of the white center line and the road edge.

Based on this image, various data pertinent to the proper control of the vehicle is extracted The extraction will become more clearly understood hereinafter as detailed explanation of the various techniques which characterize the instant invention unfold.

In addition to this, the distance from the center of the vehicle to an approaching intersection can be approximated by detecting the disappearance of the center line.

The above mentioned data which is extracted from the image developed in section 100 constitutes what shall be referred to as "local" vehicle position or status related data, and is compiled in a local vehicle position determining unit or section 107.

In the instant system the sensor section 200 includes ultrasonic and laser radar type sensors. These sensors are arranged to sense the presence of other vehicles, guard rails on the side of the road and the like obstacles. In this instance, these sensors are arranged to provide sufficient data for the vehicle to proceed even in the absence of the data inputted via the image processing section and, thus, defines a back-up or fail-safe arrangement which can compensate for the malfunction of the image processing section.

More specifically, in the instant system, ultrasonic sensors 201, 203, 205, and 207 are arranged to sense conditions prevailing ahead of, behind and on either side of the vehicle. For example, with these sensors it is possible to sense the guard rail at the side of the road and to independently develop the equivalent data which is extracted from the image developed in section 100. Further, by sensing the disappearance of the guard rails, it is possible to predict the approach of an intersection located T meters ahead The sensing section 200 further includes a laser radar 109 and a forward ultrasonic sensor 210. The inputs from these sensors also provide back-up or fail safe, information which complements the obstacle avoidance data provided by the cameras by independently detecting the presence of obstacles in the path of the vehicle and with which the vehicle is apt to collide.

This data can be used to induce the necessary steering, stoppage or speed reduction of the vehicle if required.

Wheel speed sensors 211 and 213 provide data which relates to the movement and turning of the vehicle and which can be used in combination with the data inputted by the other sensors of the sensor section 200 in a manner which permits data accuracy verification.

The input of the wheel speed sensors 211, 213 are collected in a wheel speed data processing section 218 and used in conjunction with related data from the sensor battery, including ultrasonic sensors 201-207, to develop and compile what shall be referred to as "global" data in unit 219

By way of example, the wheel speed sensors can be arranged to generate from 1000 to 4000 pulses per wheel rotation. Thus, the difference between the wheel speed inputs can be used to ascertain whether the vehicle is traversing a curve or proceeding in a straight line and can be used when comparing and/or developing control data relating to the position and attitude of the vehicle on the road.

As will be appreciated, it is important to ensure that the minimum amount of incorrect or erroneous values are developed as the accumulation of such errors has a large influence on the development and validity of the "global" data The actuator section 300 contains a plurality of actuators which replace the control normally provided by a human operator. Viz., this section includes a steering actuator 301, a throttle valve actuator 303 which replaces the input normally provided through the accelerator pedal, a brake actuator 305 and a turn indicator controller 307. Of course the present invention is not limited to the above listed elements, and other actuators can be provided as desired. By way of example only, it is possible to provide a light sensor which detects the amount of light available and a circuit or actuator which can selectively switch on the lights of the vehicle in dark environments and thus assist the image processing section in accurately observing the road and surrounding conditions. Another actuator which sounds the vehicle horn can be provided and arranged to be responsive to the control section to suitably sound an alarm signal.

In the instant arrangement, it is assumed that the vehicle includes an automatic transmission (A/T) which includes its own self-contained autonomous control system such as a hydraulic spool valve network which is basically responsive to engine load and vehicle speed signals However, if a manual transmission (MT) is employed, actuators or servo devices which operate the clutch and move the shift lever are necessary and would be incorporated in this section of the system. Under such conditions it may be necessary to provide an engine load sensor which can be used in connection with the vehicle speed sensor 714 provided in the vehicle speed control section 700. However, as such controls are well known in the art of automotive transmissions no further explanation of these types of arrangements will be given.

The navigation section 400 includes a memory 401 (e.g. ROM) in which map data is stored and a data access section 403 which selectively accesses the memory in accordance with commands inputted via a bus interconnecting it and a central control section 503 of the control section 500. With this section, the vehicle is able to maintain a fix on its own position and facilitate the confirmation and use of the global data which is developed, for the purposes of navigating the vehicle to a predetermined destination or over a given course. Although not shown, it is within the scope of the present invention that this section be provided with or connected to a transceiver via which data relating the instant vehicle position can be received from a suitable beacon or beacons.

With this arrangement, the system is able to plot a course which will bring the vehicle to a predetermined position or work place which has been denominated by data input by the man-machine interface 600 to the central control section 503.

The central control section functions to plan the operation of the vehicle based on the the various data inputs and to drive, based on the commands received from, the man-machine interface 600, the vehicle without a human operator. This section further functions to produce correction data based on the local data, and to use this when considering the content of the local data.

Subsequently, the control section 500 produces a plan which results in commands which selectively determine if the vehicle should be steered to the left or right and by how much, if the speed should be increased, decreased or the vehicle brought to a halt.

For example, if the vehicle is deemed to be approaching an intersection, the vehicle speed can be reduced to a level deemed safe.

Particularly when traversing an intersection, data from the obstacle avoidance control section 501 is given a large amount of weight along with the data input from sections 215 and 217.

With the instant invention the actuator control is adapted to be "fuzzy"That is to say, the control is adapted to follow an "if . . . then . . . " rule and thus enable a type of control which emulates that provided by a human operator.

The man-machine interface 600 includes a keyboard and CRT display arrangement via which data can be manually inputted and visually checked However, in lieu, or in place, of this combination, it is possible to use a digitizer unit (in place of the keyboard) and/or provide this section with a microphone and speech recognition type system whereby spoken commands can be recognized and subsequently transmitted to the central control section 503. With this latter mentioned provision it is possible for a supervisor to "speak" to the machine and give it suitable verbal orders. Of course it is within the scope of the present invention that these orders can be transmitted by transceivers such as mobile telephones, walkie talkies or the like, from a distance in addition to or in lieu of the commands being issued in an audible range of the vehicle.

The vehicle speed control section 700 includes an emergency brake actuator 701 which is controlled by a control unit or section 703. This section 703 is arranged to receive emergency braking data and command inputs from an antenna 705 via a receiver 707, an emergency brake switch 709 and an upper speed limiter circuit 711.

The latter mentioned circuit is responsive to a variable resistor or the like device which can be set in a manner to determine the absolute upper speed. The vehicle speed sensor 714 is operatively connected to the upper speed limiter circuit 711.

Data from the upper speed limiter is fussed to a steering control section 505 of the central control section 500 and from there to the actuator control section 300 and to the central control section 503.

The vehicle is provided with a data recording section 800. This section functions in manner similar to an aircraft "flight recorder" and for this reason will be referred to as a flight recorder hereinafter.

This section includes a data recording unit which receives data from the steering control section 505 and from a G sensor unit. This latter mentioned device renders it possible to monitor the accelerations that the vehicle is subject and to record these along with the bused data in a manner which enables a meaningful record to be established With the above described arrangement, the image processing section receives data from the cameras 101 and 103 and develops an image from which the distance to the road centerline and the edge of the road are derivable. In this instance it will be assumed that the vehicle is arranged to travel on the left hand side of the road and thus develops a value XL indicative of the distance to the edge of the road and a value 2X indicative of the width of the lane on which the vehicle is running. Viz., the distance from the side of the road to the centerline The change in direction of the center line is also derived from the image and used to determined the amount of curvature (theta) in the road. This derivation will be dealt with in more detail hereinlater. The distance to the next intersection Y is determined by noting the disappearance of the center line. All of this data is grouped as "local data" in local position determining unit 107.

At the same time the wheel speeds of the left and right rear wheels of the vehicle are detected by the wheels speed sensors 211 and 213. This data is periodically checked and the difference between the two values noted. This data is grouped as "global data".

Even though the above local and global data should indicate exactly the same positional results, it happens in actual practice that a number of discrepancies occur between the two data groups. For example, the development of the local data can, be influenced by noise which disturbs the image created in the image computing system 105 to the degree that some of the measurements which are taken from the image are rendered slightly erroneous. On the other hand, if the vehicle proceeds over a long distance, errors, due to slight changes in the diameter of the wheels (for example due to temperature related changes in tire pressure - slight differences in the left and right hand rear tires etc.) can accumulate Thus, neither can be relied upon to perfectly reflect the actual situation.

For this reason the system to which the embodiments of the invention are applied are arranged to compare the local and global data and accepts only results which fall within a predetermined deviation range and which can be therefore assumed to be essentially correct. Only data which selectively passes this screening is permitted to be used to determine the instant vehicle status.

Figure 4:
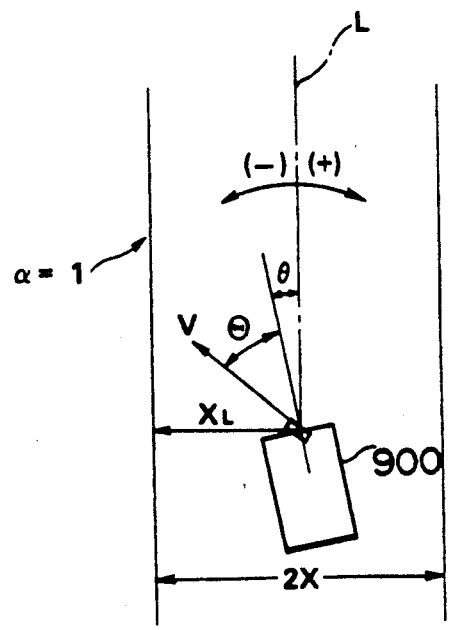
FIG. 4 is a schematic plan view showing the vehicle and the parameters which effect its navigation and steering controls.
Figure 7:
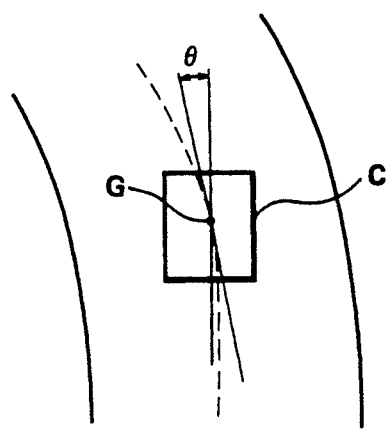
FIG. 7 shows a vehicle traversing a curved road and the manner in which the attitude angle of the vehicle is measured

FIGS. 4 and 7 show in diagram form the various parameters which are involved in the control of an embodiment of the present invention. In FIG. 4 the numeral 900 denotes the vehicle which is running on a straight road (having a curvature of alpha=1) the middle of which is indicated by an imaginary line L. The angle defined between the longitudinal axis of the vehicle 900 and the line L is denoted by theta while the the angle between the longitudinal axis and the direction in which the vehicle wheels are being steered is denoted by THETA. In this figure, a convention wherein deviation of the longitudinal axis of the vehicle to the left of the line L is given (−) weight factor while deviation to the right is provided with a weight factor (+). The distance from the longitudinal axis of the vehicle to the road side line is denoted by XL In FIG. 7 the letter G denotes the center of gravity of the vehicle C. In this figure the road is shown curving to the left. Under these circumstances the angle theta which represents the attitude of the vehicle with respect to the road is defined between a tangent of the curved imaginary line broken line which drawn along the middle of the lane in which the vehicle is running, and the longitudinal axis of the vehicle.

Figure 5:
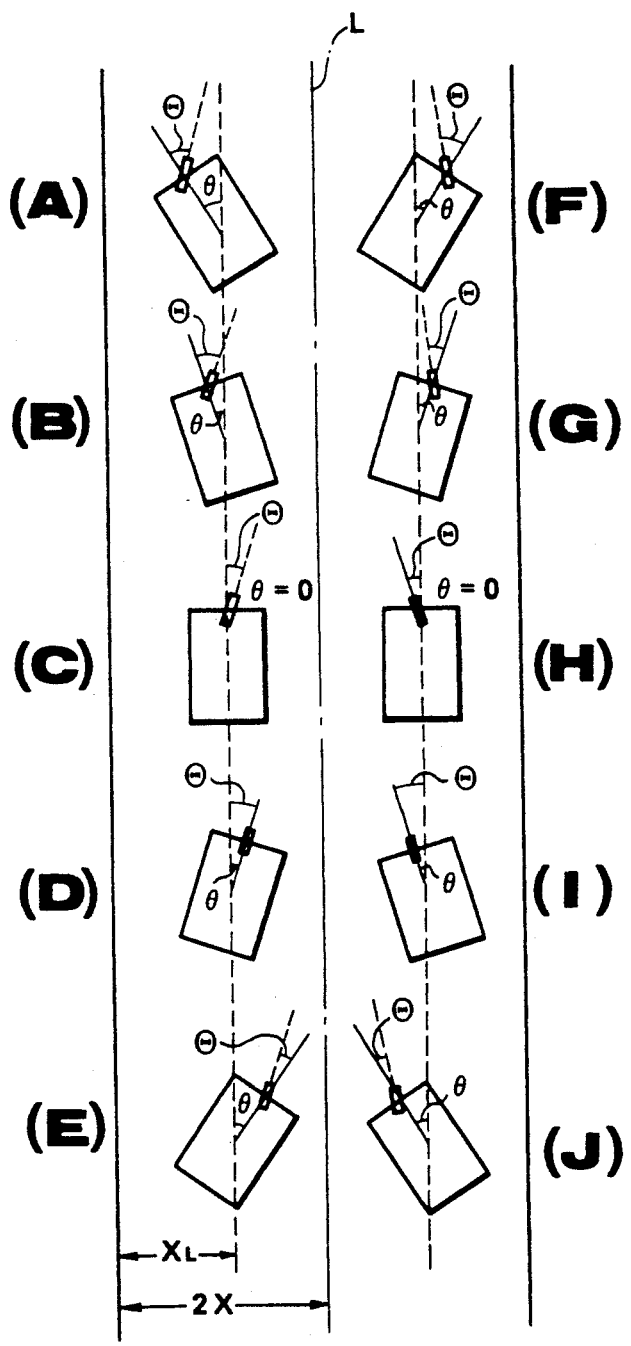
FIG. 5 shows a plurality of vehicle attitude and steering modes which can be encountered by a vehicle.

FIG. 5 shows 10 different possible situations A-J which demonstrate the various possible combinations of steering angle and vehicle attitude which can occur during the running of the vehicle along a road. In this figure, the vehicle is located at a distance XL from the road side line and is running on a lane having a width 2X. In situation A the vehicle is shown as having an attitude which defines a large negative direction angle theta. The arrangement in B is such that theta is small while in situation C theta=0.

Conversely, in situation D the attitude of the vehicle is such as to define a small positive direction angle theta while in situation E the value of theta has increased to a large value.

In situations F to J are in terms of vehicle attitude essentially mirror images of the situations A to E. This mirror image relationship holds for both the attitude angle theta and steering angle THETA which occurs in each of the respective pairs of situations.

Figure 6:
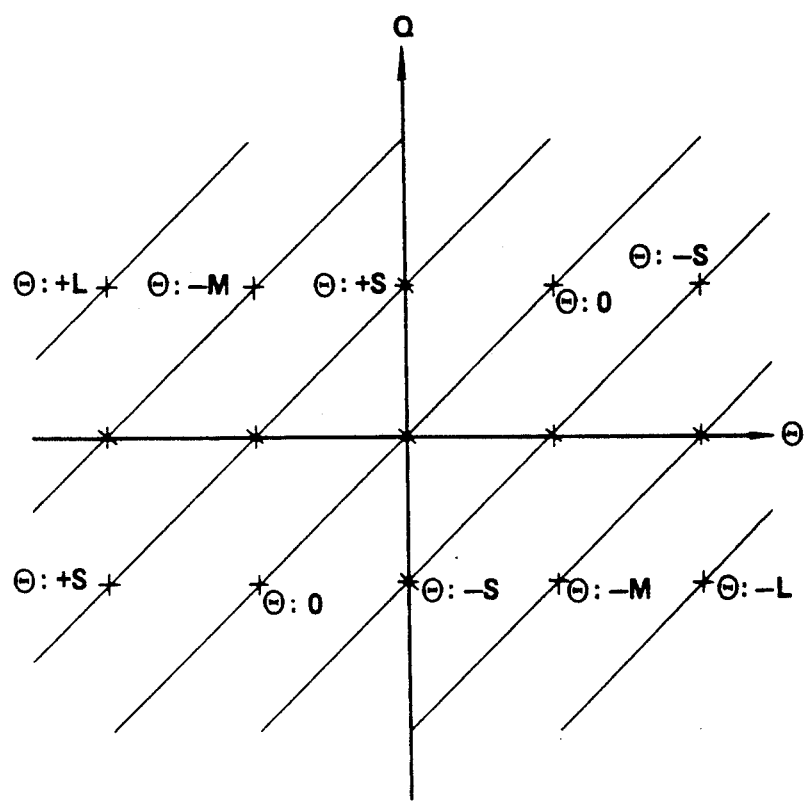
FIG. 6 shows one of a plurality of tables which are prememorized and set in a ROM or the like, and which are used to determine the best steering angle for a given set of conditions.

FIG. 6 shows a control table which is logged in terms a parameter Q the value of Which is assessed on the basis of road curvature ratio alpha, vehicle speed V, a road having a width 2X and wherein the vehicle is located at at a distance XL from the road side line; and theta. This table shows in terms of alpha and V a plurality of THETA value representative traces which are spaced at even intervals.

The instant embodiment provides for a plurality of tables to the recorded and arranged in a manner that when the vehicle speed V1 doubles (V2=2V1), or reduces by half, a new table which is adapted for the new speed is selected for use.

The value of Q is calculated using the following equation:

$$Q=(alpha\ X-XL)/V \quad (1)$$

wherein:
alpha=denotes the curvature of the road;

It will be noted that when the vehicle is running close to the left hind side of the road and the value XL is small the value of Q increases.

Figure 10:
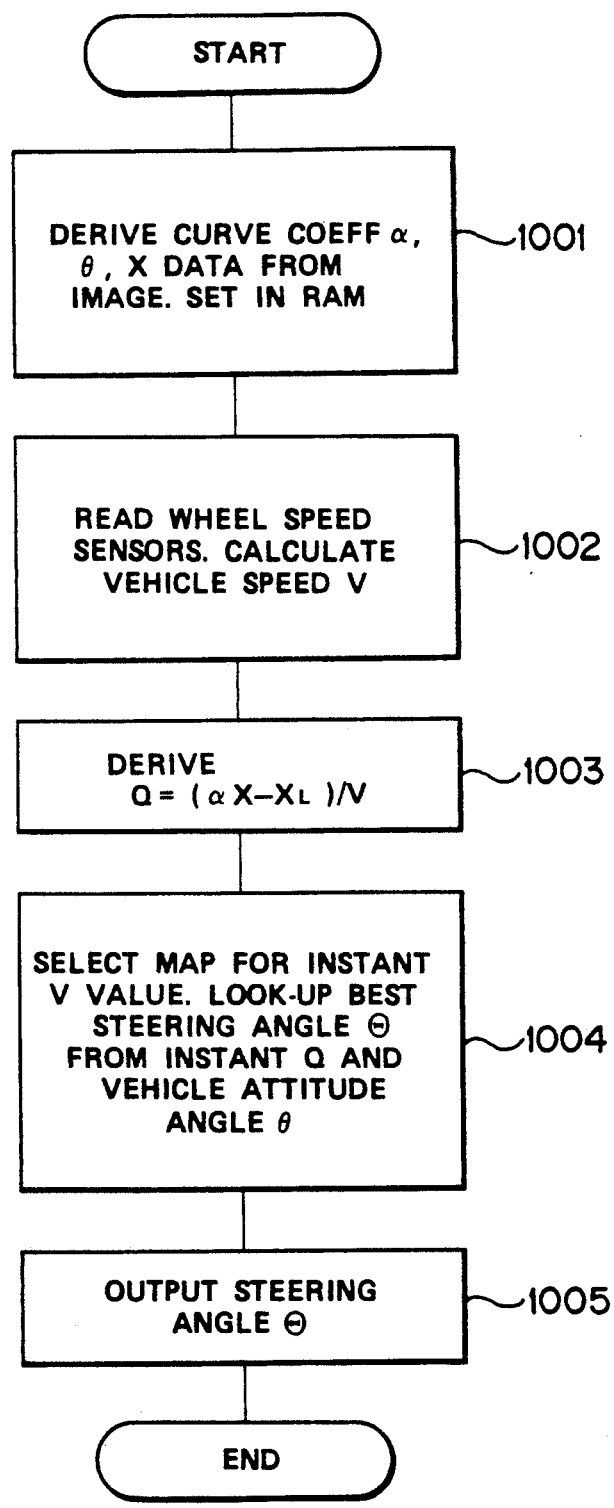
FIG. 10 is a flow chart of the operations which characterize the first control technique of the present invention.

Further explanation will now be given with reference to the flow chart shown in FIG. 10.

Figure 12:
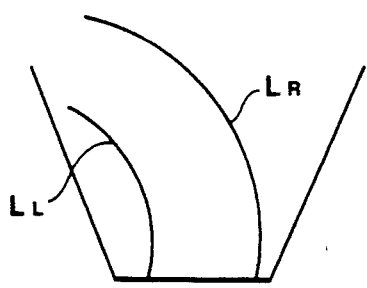
FIG. 12 shows the image in FIG. 2, rectified in a manner which allows data to be extracted therefrom.
Figure 13:
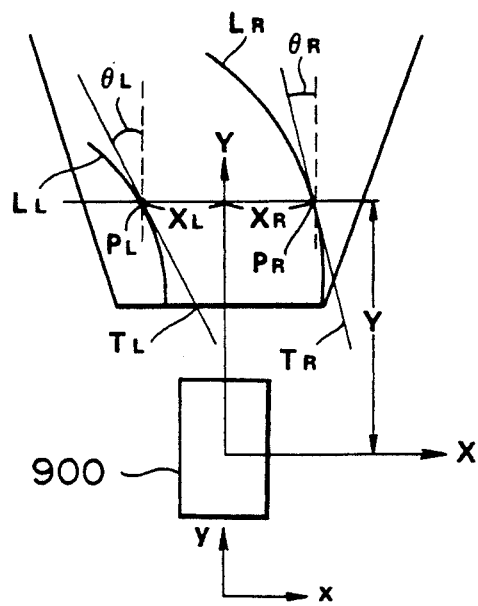
FIGS. 13 and 14 show a technique of analyzing the curvature of the curving road and for developing data according to a second road curvature analyzing technique of the present invention.

At step 1001 the image data which is collected by cameras 101 and 103 is used to develop a three dimensional image of the nature shown in FIG. 12. By appropriately rectifying this image into a two dimensional or planar image in the manner as shown in FIG. 13 it is possible to directly extract data such as the width of the lane (2X), the distance of the vehicle from the road side line (XL) and the rate the road is curving (alpha) and in which direction it is curving.

It is further possible to determine the instant vehicle orientation (angle theta).

At step 1002 the instant vehicle speed is determined by sampling the output of the vehicle wheel speed sensors 211 and 213 and calculating the vehicle speed using these two values. Following this, at step 1003, the instant value of Q is derived using equation (1).

At step 1004 the vehicle speed derived in step 1002 and the value of Q calculated in step 1003 are used in step 1004 to select the most appropriate control map and using the instant values of Q and theta (derived in step 1001) are read out of RAM and used in a table look-up to derive in step 1005 the most appropriate steering angle THETA.

Figure 8:
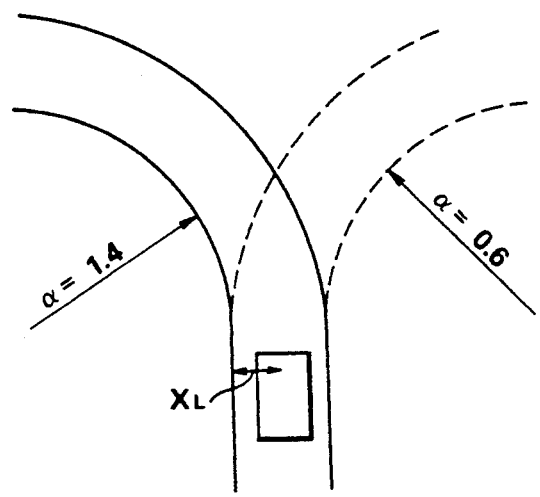
FIGS. 8 and 9 show examples of the convention used in the first technique for indicating the road curvature and direction in which it curves.
Figure 9:
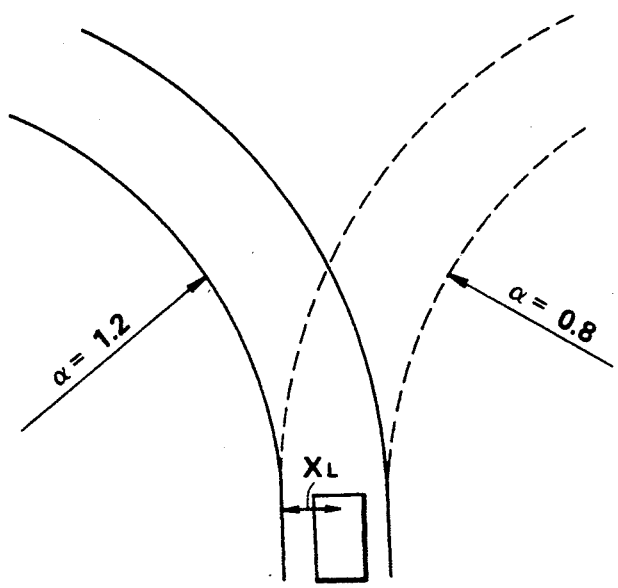

FIGS. 8 and 9 show examples of a vehicle traversing a curved road. In accordance with the first embodiment the value of alpha indicates both the direction and the degree to which it is curving. Viz., when alpha is equal to 1 the road is deemed straight, when alpha becomes greater than 1 the road is deemed to be curving to the left while when less than 1 the road is deemed to be curving to the right.

Figure 11:
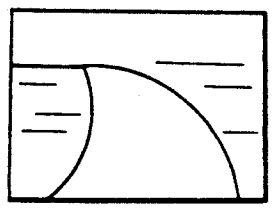
FIG. 11 shows an example of a three dimensional image which is developed during the operation of the system shown in FIG. 1.
Figure 14:
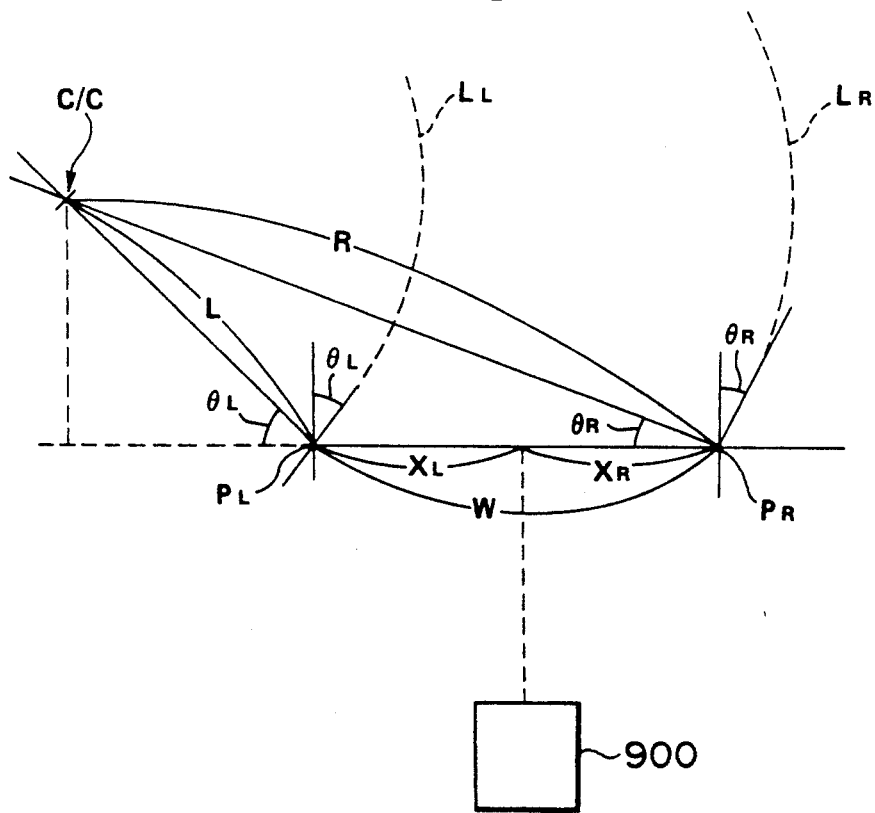
Figure 15:
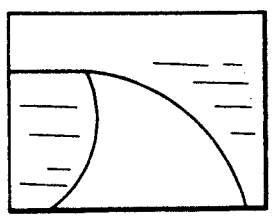
FIGS. 15 and 16 depict the same information as FIGS. 11 and 12.
Figure 16:
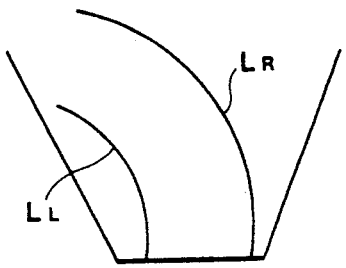

A first analytical technique via which the vehicle attitude angle and road curvature data is determined is demonstrated in FIGS. 13 and 14. As shown, in these figures the data which is obtained by rectifying the three dimensional image developed in FIG. 11 is used to establish the road curvature conditions at a distance Y meters ahead of the vehicle. At this distance ahead of the vehicle the distance of the center of the vehicle from the road side line (XL) and the distance to the centerline or similar feature which defines the right hand edge of the lane on which the vehicle is running (XR). Tangential lines TL, TR are developed at the point PL and PR where the line along which the lateral measurements parameter) are made intersect the left and right hand edges of the lane. The angle theta L and theta R defined between lines which pass through the points PL and PR and which extend parallel to the Y direction and the tangent lines are subsequently generated.

The above data including the difference between theta L and theta R is fed to section 107 in which the "local" vehicular position data is compiled.

In this section the data is compiled in a manner such as depicted by table 1.

TABLE 1

| θR | θL | (θL-θR) | CURVE | ATTITUDE |
|---|---|---|---|---|
| − | − | + | RIGHT | + |
| − | − | 0 | NONE | + |
| − | − | − | LEFT | + |
| + | − | − | ERROR | |
| − | + | + | ERROR | |
| + | + | + | LEFT | − |
| + | + | 0 | NONE | − |
| + | + | − | RIGHT | − |

As will be appreciated when:
(i) theta R<0, theta L<0 & (theta L−theta R)>0; or
(ii) theta R>0, theta L>0 & (theta R−theta L)<0 then the road is deemed to be curving to the right. On the other hand, when:
(iii) theta R<0, theta L<0 & (theta R−theta L)<0; or (iv) theta R>0, theta L>0 & (theta R−theta L)>0 then it is assumed that the road is curving to the left. When theta R=theta L it is assumed that the curvate is zero and the road is straight As will be appreciated by comparing the magnitudes of the theta R, theta L and the difference therebetween, the difference between a straight road, a road which curves to the left and a road which curves to the right can be determined. It is also possible to detect erroneous data and avoid the use of the same. Viz., as shown, in the event that theta L and theta R have reversed polarities it can be assumed that the data which has been taken from the image is erroneous for some reason or other and an error is indicated. On the other hand, when the two polarities are the same the nature of the difference indicates the direction in which the road is curving in the manner depicted in the table.

In addition to the above difference between the values of XL and XR are derived. In the event that the result X is equal to zero, it is assumed that the vehicle is running down the middle of the lane and equidistantly arranged from the left and right edges of the same.

It is further possible to develop additional data as shown in FIG. 14. Viz., by using the following equations it is possible to determine the width of the lane (in this instance denoted by W for clarity) and the center of curvature C/C.

$$W = XR + XL \quad (1)$$

$$L\sin\theta L = R\sin\theta R \quad (2)$$

$$L\cos\theta L + W = R\cos\theta R \quad (3)$$

From the above equations it is possible to show that:

$$L\cos\theta L + W = L\sin\theta L \cdot \cos\theta R/\sin\theta R \quad (4)$$

and therefore:

$$L(\cos\theta L - \sin\theta L \cdot \cos\theta R/\sin\theta R) = -W \quad (5)$$

In view of this it can be shown that for the road side line LL $$\begin{aligned} L &= W\sin\theta R/(\sin\theta L \cdot \cos\theta R - \cos\theta L \cdot \sin\theta R) \\ &= W\sin\theta R/\sin(\theta L - \theta R) \end{aligned} \quad (6)$$

Figure 17:
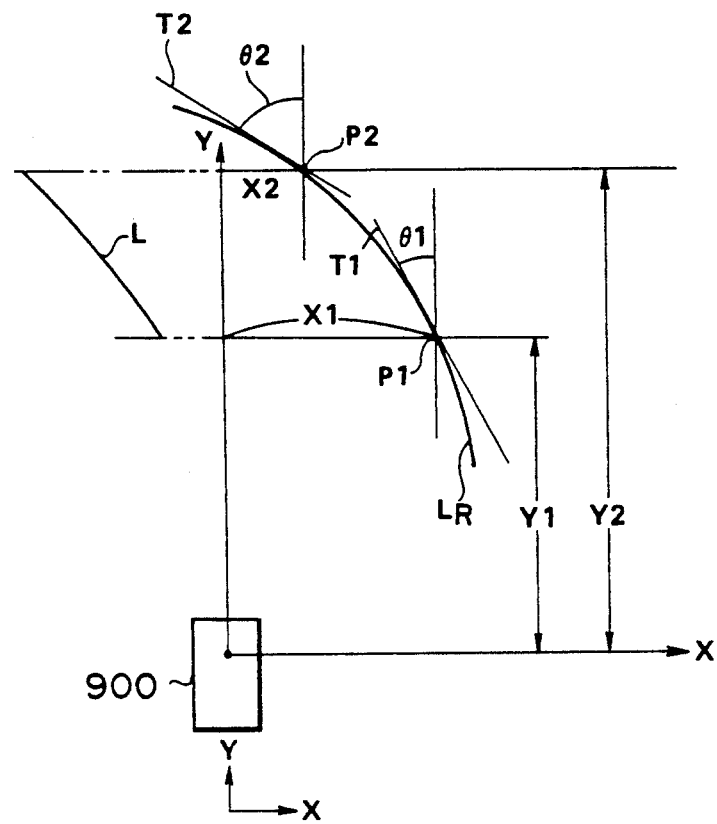
FIGS. 17 and 18 show a technique for analyzing the image data and for developing control data according to a third embodiment of the present invention.
Figure 18:
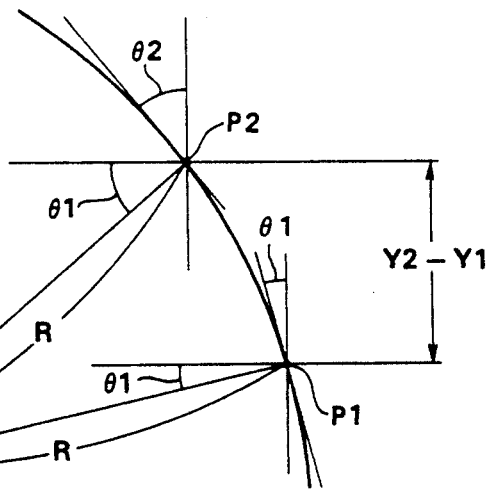

In the case the road curves to the right it is possible to suitably transpose data and perform a similar calculation in this case also A second analytical technique via which the vehicle attitude angle and other pertinent road curvature data can be derived is demonstrated in FIGS. 17 and 18.

According, to this technique, data is developed at two levels or distance ahead of the vehicle. In this instance the first level is located at Y1 meters ahead of the vehicle while the second level is located at a level Y2 meters ahead of the same. The two points P1 and P2 where the two levels intersect the line LR (viz., the white center line of the road or the like) Which denotes the right hand boundary of the lane on which the vehicle is running, are established and subsequently used in the generation of two tangent lines T1 and T2. Vehicular attitude angles theta 1 and theta 2 are respectively determined by measuring the angle which occurs between the tangent lines and lines which extend in the Y direction parallel with the longitudinal axis of the vehicle.

The distances X1 and X2 defined between the points P1 and P2 and the extrapolation of the longitudinal axis of the vehicle are also measured In accordance with the instant technique, the above mentioned data is fed to section 107. In this section the data is compiled in the manner depicted by Table 2. This table is arranged in a manner similar to the second embodiment.

TABLE 2

| θ1 | θ2 | (θ2−θ1) | CURVE | ATTITUDE |
|---|---|---|---|---|
| − | − | 0 | NONE | + |
| − | − | + | LEFT | + |
| − | − | − | RIGHT | + |
| + | − | − | RIGHT | − |
| − | + | + | LEFT | + |
| + | + | 0 | NONE | − |
| + | + | + | LEFT | − |
| + | + | − | RIGHT | − |

As will be appreciated when:

(i) theta 1<0, theta 2<0 & (theta 2−theta 1)<0;

(ii) theta 1<0, theta 1>0, theta 2<0 & (theta 2−theta 1)>0; and (iii) theta 1>0, theta 2>0 & (theta 2−theta 1)<0 it is indicted that the road is curving to the right. However, when:

(iv) theta 1<0, theta 2<0 & (theta 2−theta 1)>0;

(v) theta 1<0, theta 2>0 & (theta 2−theta 1)>0; and (vi) theta 1<0, theta 2>0 & (theta 2−theta 1)>0 then it is indicated that the road is curving to the left.

In connection with the vehicle attitude when theta 1=theta 2 or when theta 1 and theta 2 have reversed polarities it is assumed that the road is straight and is not curving.

It is within the scope of the present invention to record the data and compare the same at predetermined intervals and/or use the previously recorded values until such time as the validity of the instant values are verified by comparison with the global data provided by the global vehicle position determining unit or section 219.

The angular difference (theta 2−theta 1) or alternatively (Sin theta 2−Sin theta 1) is desirable in that an increasing difference indicates that the curvature of the road is increasing, while a low value is indicative of an essentially straight road. Hence, at the beginning of a curve in the road the difference slowly increases.

The following equations are used in connection with the instart technique for the derivation of the curvature of the road. From FIG. 4 it will be seen that:

$$R = (Y1-Y2)/(\sin\theta 2 - \theta 1) \quad (7)$$

The inverse of the above is represented by:

$$1/R = (\sin\text{theat } 2 - \sin\theta 1)/(Y2-Y1) \quad (8)$$

It is possible to advantageously use the above inverse relationship in that, as the curvature of the road increases and the radius of curvature R become smaller, the inverse value increases.

The above disclosed analysis is conducted at a high frequency, for example every 0.1 seconds an thus ensures that adequate control of the vehicle provided.

It will be noted that although the vehicle has been disclosed in connection with a vehicle which is arranged to be driven on the left hand side of the road and as running on lane which is defined between the least hand edge of the road and a white center line or the like, the control can be implemented in a manner which permits the vehicle to run along a multi-lane road. Viz., be adapted to run between two white (or similarly bright colored) lines if so desired. Alternatively, the image processing section 100 can be arranged to control the vehicle in the case of a right hand drive convention without problem. Further, while the control has been such as to guide the vehicle down the middle of the lane the control can be set in manner as to guide the vehicle along a path defined close to one side of the road and thus make provision for other Vehicles to overtake.

As the handle over which the camera is effective is limited it is within the scope of the present invention to, rather than observing the same side of the road in all situations, concentrate the cameras 101, 103 on the left hand side of the road in a manner to ensure the accuracy of line which defines left hand side or boundary of the road in the image produced when the vehicle is traversing a bend in the road which curves to the left and vice versa.

We claim:

1. In a method of controlling an unmanned vehicle, the steps of:
    observing a road using camera means;
    producing an image of the road based on the output of the camera means;
    rectifying the image in a manner which depicts the left and right hand edges of the lane on which the vehicle is running and which enables data to be read therefrom;
    determining the curvature of the road and the direction in which it is curving;
    determining the attitude of the vehicle on the road by determining the angle between the longitudinal axis and an imaginary line which runs along the middle of the lane depicted in the rectified image;
    determining the vehicle speed;
    determining a variable which varies as a function of the road curvature, the distance of the center of the vehicle from a side of the lane on which the vehicle is running and the vehicle speed;
    performing a table look-up on a selected map using the attitude angle and the variable, to derive a steering angle; and
    controlling the angle of the steering wheels of the vehicle with respect to the longitudinal axis of the vehicle to the derived steering angle.

2. A method as claimed in claim 1 wherein said step of curvature determination comprises:
    establishing a measurement level line on the rectified image at a location representative of a predetermined distance ahead of said vehicle;
    determining first and second points intersect at the locations where said level lines the left and right hand edges of the lane, respectively;
    determining the distance from the point that the longitudinal axis of the vehicle intersects said level line to the left hand edge of the lane;
    determining the distance form the point that the longitudinal axis of the vehicle intersects said level line to the left hand edge of the lane;
    generating first and second lines which pass through said said point and which extend parallel to the longitudinal axis of the vehicle and normal to said level; and
    generating third and fourth lines which pass through said first and second points and which extend tangentially with respect to any curvature which exists in the left and the road lane edges at said first and second points, respectively; and
    measuring first and second angles, said first angle being defined between said fiesta and third lines and said second angle being defined between said second and fourth lines.

3. A method as claimed in claim 2 further comprising the steps of:
    comparing said first angle, said second angle and the difference between said first and second angles in manner to determine the attitude of the vehicle on said lane.

4. A method as claimed in claim 3 wherein said comparing step includes assigning polarities to said first and second angles in accordance with a convention wherein angles defined on the left of said first and second lines are given a first polarity and angles which are defined on the right of said first and second lines are given a second polarity.

5. A method as claimed in claim 4 wherein the first and second angle data is deemed erroneous in the event that the polarities of said first and second angles are different.

6. A method as claimed in claim 1 wherein said step of curvature determination comprises:
    establishing first and second level lines on the rectified image, said first and second level lines being drawn on said image at first and second distances ahead of said vehicle, said second distance being grater than the first distance;
    determining first and second points on a selected one of the left and right hand lane edges, where said first and second level lines intersect the same;
    generating first and second lines which pass through said first and second points and which are normal to said first and second level lines respectively and parallel with the longitudinal axis of said vehicle;
    generating third and fourth lines which pass through said first and second points respectively, said third and fourth liens being arranged to be tangential to any curve that exists in the selected one of said left and right hand lane edges; and
    measuring first and second angles said first angle being defined between said first and third lines and said second angle being defined between said second and fourth lines.

7. A method as claimed in claim 6 further comprising the steps of:
    comparing said first angle, said second angle and the difference between said first and second angles in manner to determine the attitude of the vehicle on said lane.

8. A method as claimed in claim 7 wherein said comparing step includes assigning polarities to said first and second angles in accordance with a convention wherein angles defined on the left of said first and second lines are given a first polarity and angles which are defined on the right of said first and second lines are given a second polarity.

9. A method as claimed in claim 1 wherein said step of observing is carried out using first and second cameras and wherein said step of producing an image comprises producing a stereo image.

10. A method as claimed in claim 9 wherein said step of rectifying comprises converting said stereo image into a planar image.

11. In an unmanned vehicle travelling on a lane of a road,
   camera means for observing the road;
   second means responsive to said camera means for:
   producing an image of the rod;
   rectifying the image in a manner which depicts a left hand and right hand edge of the lane on which the vehicle is running and which enables data to be read therefrom;
   determining any curvature of the road and the direction in which it is curving;
   determining the attitude of the vehicle on the road by determining the angle between the longitudinal axis and an imaginary line which runs along the middle of the lane depicted in the rectified image;
   determining the vehicle speed;
   determining a variable which varies as a function of road curvature, the distance of the enter of the vehicle from a side of the lane on which the vehicle is running and vehicle speed;
   performing a table look-up on a selected map using the attitude angle and the variable, to derive a steering angle; and
   means or controlling the range of the steering wheels of the vehicle in accordance with the output of the second means with respect to the longitudinal axis of the vehicle to the derived steering angle.

12. A vehicle claimed in claim 11 wherein said second means
   establishes a measurement level line on the rectified image at a location representative of a predetermined distance ahead of said vehicle;
   determines first and second points oat the locations where said level lines intersect the left and right hand edges of the lane, respectively;
   determines the distance from the point that the longitudinal axis so the vehicle intersects said level line to the left hand edge of the lane;
   determines the distance form the point that the longitudinal axis of the vehicle intersects said levelline to the left hand edge of the lane;
   generates first and second lines which pass through id said point and which extend parallel with the longitudinal axis of the vehicle and normal to said level;
   generates third and fourth lines which pass through said first and second points and which extend tangentially with respect to any curvature which exits in the left and the road lane edges at said first and second points, respectively; and
   measures first and second angles, said first angle being defined between said first and third lines and said second angle being defined between said second and fourth lines.

13. A vehicle as claimed in claim 12 wherein said second means further:
   compares said first angle, said second angle and the difference between said first and second angles in manner to determine the attitude of the vehicle on said lane.

14. A vehicle as claimed in claim 13 wherein said second means further:
   assignees polarities to said first and second angles in accordance with a convention wherein angles defined on the left of said first and second lines are given a first polarity and angles which are defined on the right of said first and second lines are given a second polarity.

15. A vehicle as claimed in claim 14 wherein second means further:
   indicates the first and second second angle data as being erroneous in the event that the polarity of said first and second angles are different.

16. A vehicle as claimed in claim 11 wherein said second means;
   establishes first and second level lines on the rectified image, said first and second level lines being drawn on said image at first and second distances ahead of said vehicle, said second distance being greater than the first one;
   determines first and second points on a selected one of the left and right hand lane edges, where said first and second level lines intersect the same;
   generates first and second lines which pass through said first and second points and which are normal to said first and second level lines respectively and parallel with the longitudinal axis of said vehicle;
   generates third and fourth lines which pass through said first and second points respectively, said third and fourth lines being arranged to be tangential to any curve that exists in the selected one of said left and right hand lane edges; and
   measures first and second angles, said first angle being defined between said first and third lines and said second angle being defined between said second and fourth lines.

17. A vehicle as claimed in claim 16 wherein said second means further;
   compares said first angle, said second angle and the difference between said first and second angles in manner to determine the attitude of the vehicle on said lane.

18. A vehicle as claimed in claim 17 wherein said said second means assigns polarities to said first and second angles in accordance with a convention wherein angles defined on the left of said first and second lines are given a first polarity and angles which are defined on the right and said first and second lines are given a second polarity.

19. A vehicle as claimed in claim 11 wherein said first means comprises first and second cameras which are arranged to produce a stereo image.

20. A vehicle s claimed in claim 19 wherein said second mean converts said stereo image into a planar image.

21. In an unmanned vehicle
   a system for controlling said vehicle, comprising:
   first and second cameras for observing the road on which the vehicle is running;
   a wheel speed sensor arrangement, said wheel speed sensor arrangement producing a signal indicative of the rotational speed of first and second road wheels and from which the vehicle speed can be derived;
   a time computing section operatively connected to said first and second cameras, said image computing section including means for;
   producing an image of the road;
   rectifying the image in a manner which depicts left and right hand edges of the land on which the vehicle is running; and
   determining the curvature of the road and the directions in which it is curving;

a steering control control section operatively connected with said image computing section, said steering control section including means for:

determining the attitude of the vehicle on the road by determining the angle between the longitudinal axis and an imaginary line which runs along the middle of the lane depicted in the rectified image;

determining a variable which carries as a function of road curvature, the distance of the center of the vehicle from a side of the lane on which the vehicle is running and the vehicle speed; and using the attitude angle and the available to derive a steering angle;

a steering control actuator, said steering control actuator being operatively connected with the steerable wheels of the vehicle;

an actuator control section; said actuator control section being operatively interposed between said steering control section and said steering control actuator; said actuator control section controlling the angle of the sterring wheels of the vehicle with respect to the longitudinal axis of the vehicle to the derived steering angle.

22. In an unmanned vehicle, a system for controlling said vehicle, said system comprising:

electronic stereo image data means for depicting the lane in which the vehicle is running;

rectifying means or converting the stereo image data into a planer image on which one or more level lines can be generated, these generated lines intersecting one or both of the edges of the lane in which the vehicle is running;

angle measuring means for measuring the angles between lines which extend from these points of intersection in a direction normal to the level line or liens and which extend tangentially to any curvature which occurs in the road edges at the point of intersection; and means for recording these angles and computing the difference therebetween, said difference therebetween indicating a best steering angel of the vehicle in accordance with a look-up performed on a selected map using an attitude angle and a variable.

23. A method of controlling a vehicle traveling along a road, comprising the steps of:

producing an image of the road by means of a camera;

rectifying the image into a planar two dimensional image and a three dimensional image of the lane from images which the curvature of the lane, the width of the lane, the distance of the center of the vehicle form a side of the lane, and the attitude of the vehicle on the lane, can be determined, said step of determining the attitude of the vehicle on the lane being achieved by drawing a line along the middle of the lane depicted n the rectified image and determining the angle between the longitudinal axis of the vehicle and the line;

determining vehicle speed by reading the output of a vehicle speed sensor;

deriving a control parameter value which varies with the product of (a) the difference between the width of the lane and the distance of ht center of the vehicle from a side of the lane, and (b) the curvature of the lane, the product being divided by the vehicle speed;

selecting for the control value and attitude one of a plurality of pre-recorded maps from which the most appropriate steering angle can be looked up;

looking-up a steering angle for the selected map; and steering the vehicle in accordance with the steering angle so derived.

24. A control system for a vehicle, comprising:

a camera for producing an image of the road on which the vehicle is running;

means for rectifying the image into a planar two dimensional image and a three dimensional image of the lane;

means for extracting data, including the curvature of the lane, the width of the lane, the distance of the center of the vehicle from a side of the lane, and the attitude of the vehicle on the lane, from the rectified image, said data extracting means determining the attitude of the vehicle in the lane by drawing a line along the middle of the lane depicted in the rectified image and determining the angel between the longitudinal axis of the vehicle and the line;

means for determining vehicle speed by reading the output of a vehicle speed sensor;

means for deriving a control value which varies with the product of (a) the difference between the width of the lane and the distance of the center of the vehicle from a side of the lane, and (b) the curvature of the lane, the product being divided by the vehicle speed;

means for applying the control value and attitude of the vehicle on the lane to select one a plurality of pre-recorded maps from which the most appropriate steering angel can be looked up; and means for looking up a steering angel from the selected map and steering the vehicle in accordance with the steering angel derived by look-up.

25. In a method of controlling a vehicle, the steps of:

observing the road;

producing an image of the road;

rectifying the image in a manner which depicts the left and right a hand edges of the lane on which the vehicle is running and which enables data to be read therefrom;

determining the curvature of the road and the direction in which it is curving;

determining the attitude of the vehicle on the road by determining the angle between the longitudinal axis and an imaginary line which runs along the middle of the lane depicted in the rectified image;

determining the vehicle speed;

determining a variable which varies as a function of the road curvature, the distance of the center of the vehicle from a side of the lane on which the vehicle is running and the vehicle speed;

using the attitude angle and the variable to derive a steering angle; and controlling the angle of the steering wheels of the vehicle with respect to the longitudinal axis of the vehicle to the derived steering angle;

wherein said step of curvature determination comprises:

establishing a measurement level line on the rectified image at a location representative of a predetermined distance ahead of said vehicle;

determining first and second points at the locations where said level lines intersect the left and right hand edges of the lane, respectively;

determining the distance form the point that the longitudinal axis of the vehicle intersects said level line to the left hand edge of the lane;

determining the distance from the point that the longitudinal axis of the vehicle intersects said level line of the left hand edge of the lane;

generating first and second lines which pass through said point and which extend parallel to the longitudinal axis of the vehicle and normal to said level; and generating third and fourth lines which pass through said first and second points and which extend tangentially with respect to any curvature which exists in the left and the road lane edges at said first and second points, repressively; and measuring first and second angles, said first angle being defined between said first and third lines and said second angle being defined between said second and fourth lines.

26. A method as claimed in claim 25, further comprising the steps of:

comparing said first angle, said second angle and the difference between said first and second angles in a manner to determine the attitude of the vehicle on said lane.

27. A method as claimed in claim 26, wherein said comparing step includes assigning polarities to said first and second angles in accordance with a convention wherein angles defined on the left of said first and second lines are given a first polarity and angles which are define don the right of said first and second lines are given a second polarity.

28. A method as claimed in claim 27, wherein the first and second angle data is deemed erroneous in the event that the polarities of said first and second angles are different.

29. A method as claimed in claim 25 wherein said step of curvature determination comprises:

establishing first and second level lines on the rectified image, said first and second level lines being drawn on said image at first and second distances ahead of said vehicle, said second distance being greater than he first distance;

determining first and second points on a selected one of the left and right hand lane edges, where said first and second level lines intersect the same;

generating first and second lines which pass through said first and second points and which are normal to said first and second level lines respectively and parallel with the longitudinal axis of said vehicle;

generating third and fourth lines which pass through said first and second points respectively, said third and fourth lines being arranged to be tangential to any cure that exists in the selected one of said left and right hand lane edges; and measuring first and second angles, said first angle being defined between said first and third lines and said second angle being defined between said second and fourth lines.

30. A method as claimed in claim 29 further comprising the steps of:

comparing said first angle, said second angel and the difference between said first and second angles in manner to determine the attitude of the vehicle on said lane.

31. A method is claimed in claim 30 wherein said comparing step includes assigning polarities to said first and second angles in accordance with a convention wherein angles defined on the left of said firs and second lines are given a first polarity and angles which are defined on the right of said first and second lines are given a second polarity.

32. In a vehicle travelling in the lane of a road, first means for observing the road; second means responsive to said observing means for:

producing an image of the rod;

rectifying the image in a manner which depicts a left hand and right hand edge of the lane on which the vehicle is running and which enables data to be read therefrom;

determining any curvature of the road and the direction in which it is curving;

determining the attitude of the vehicle on the road by determining the angle between the longitudinal axis and an imaginary line which runs along the middle of the lane depicted in the rectified image;

determining the vehicle speed;

determining a variable which aries as a function of road curvature, the distance of the center of the vehicle from a side of the lane on which the vehicle is running and vehicle speed; and using the attitude angle and the variable to derive a steering angle; and controlling the angle of the steering wheels of the vehicle in accordance with the output of the second means with respect to the longitudinal axis of the vehicle to the derived steering angle;

wherein;

said second means establishes a measurement level line of the rectified image at a location representative of a predetermined distance ahead of said vehicle;

determines first and second points at the locations where said level lines intersect the left and right hand edges of the lane, respectively;

determines the distance from the point that the longitudinal axis of the vehicle intersects said level line to the left hand edge of the lane;

determines the distance form the point that the longitudinal axis of the vehicle intersects said level line to the left hand edge of the lane;

generates first and second lines which pass through said point and which extend parallel with the longitudinal axis of the vehicle and normal to said level;

generates third and fourth lines which pass through said first and second points and which extend tangentially with respect to any curvature which exits in the left and the road lane edges at said first and second points, respectively; and measures first and second angels, said first angle being defined between said firs and third lines and said second angle being defined between said second and fourth lines.

33. A vehicle as claimed in claim 32 wherein said second means further assigns polarities to said first and second angels in accordance with a convention wherein angles defined on the left of said first and second lines are given a first polarity and angles which are defined on the right of said first and second lines are given a second polarity.

34. A vehicle as claimed in claim 33 wherein second means further indicates the first and second angle data as being erroneous in the event that the polarity of said first and second angels are different.

35. A vehicle as claimed in claim 32, wherein said second means further compares said first angle, said second angle and the difference between said first and second angles in manner to determine the attitude of the vehicle on said lane.

36. A vehicle as claimed in claim 35 wherein said second means establishes first and second level lines on eh rectified image, said first and second level lines being drawn on said image at first and second distances ahead of said vehicle, said second distance being greater than the first one;

determines first and second points on a selected one of the left and right hand lane edges, where said first and second level lines intersect the same;

generates first and second lines which pass through said first and second points and which are normal to said first and second level lines respectively and parallel with the longitudinal axis of said vehicle;

generates third and fourth lines which pass through said first and second points respectively, said third and fourth lines being arranged to be tangential to any curve that exists in the selected one of said left and right hand lane edges; and measures first and second angles, said first angle being defined between said first and third lines and said second angle being defined between said second and fourth lines.

37. A vehicle as claimed in claim 36 wherein said second means further;

compares said first angle, said scond angle and the difference between said first and second angles in manner to determine the attitude of the vehicle on said lane.

38. A vehicle as claimed in claim 37, wherein said second means assigns polarities to said first and second angles in accordance with a convention wherein angles defined on the left of said first and second lines are given a first polarity and angles which are defined on the right of said first and second lines are given a second polarity.

* * * * *